Feb. 19, 1957  C. H. SYLVANDER  2,781,953
GREASING RAM DEVICE WITH PLUNGER TO BOOST PRESSURE
Filed March 13, 1953
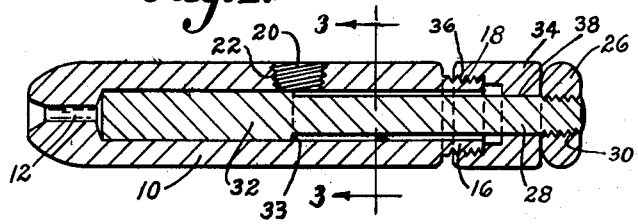
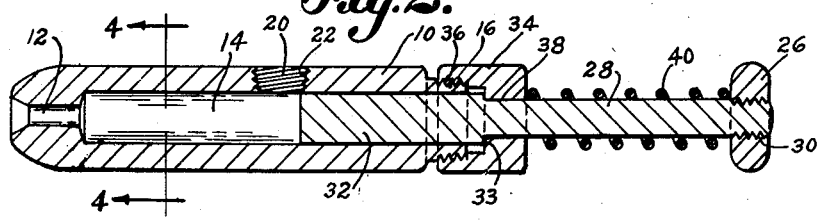
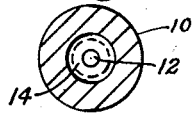
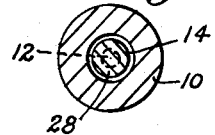
INVENTOR.
Charles H. Sylvander
BY Harold E. Cole
Attorney

United States Patent Office 2,781,953
Patented Feb. 19, 1957

2,781,953
GREASING RAM DEVICE WITH PLUNGER TO BOOST PRESSURE

Charles H. Sylvander, Taunton, Mass.

Application March 13, 1953, Serial No. 342,051

2 Claims. (Cl. 222—388)

This invention relates to a greasing ram device with a plunger to boost the pressure.

One object of my invention is to provide a greasing ram device with auxiliary means to increase the pressure upon the grease in the device, as when a grease fitting or passage is plugged up and will not receive grease by the usual means.

Another object is to provide such a device as a unit to use in normal greasing work, yet carrying the means to boost the pressure on the grease when needed.

A further object is to make said device simple in construction, with parts easy to assemble, and which can be operated by an unskilled person.

The foregoing and other objects which will appear as the nature of the invention is better understood, may be accomplished by a construction, combination and arrangement of parts such as is disclosed by the drawings. The nature of the invention is such as to render it susceptible to various changes and modifications, and therefore, I am not to be limited to the construction disclosed by the drawings nor to the particular parts described in the specification; but am entitled to all such changes therefrom as fall within the scope of my claims.

In the drawings:

Figure 1 is a longitudinal, sectional view of my device, the plunger being shown in operative position.

Figure 2 is a view similar to Figure 1; but showing the plunger in normal or inoperative position, and with the addition of a coil spring to automatically return the plunger to normal position.

Figure 3 is a sectional view taken on the line 3—3 of Figure 1.

Figure 4 is a sectional view taken on the line 4—4 of Figure 2.

As illustrated, my device has a cylindrical body 10 having a relatively small hole 12 at one end which is countersunk by tapering at its outer extremity and which is adapted to fit on the usual grease fitting. The end of said body 10 may be exteriorly screw-threaded to screw-threadedly connect with a grease fitting.

A larger hole 14 communicates with said hole 12 and extends therefrom to the opposite end of said body 10. A neck portion 16 at the end of said body 10 is exteriorly screw-threaded as at 18.

Intermediate opposite ends of said body 10 is a laterally extending hole 20 through which grease enters and passes into body hole 14. This grease inlet hole 20 is interiorly screw-threaded as at 22 to enable connection with the nozzle of grease supply apparatus.

Since grease fittings or grease passages, as in an automobile, occasionally get plugged, and ordinary greasing apparatus lacks sufficient pressure to clear said passage and force grease through, I provide a ram or plunger with my device. It has a head or cap 26, interiorly threaded, outside said body 10 from which a shaft extends that has a portion 28 of relatively small diameter that is exteriorly threaded at one end as at 30 to receive said cap 26. Said shaft has another portion 32 of greater diameter, thus providing a shoulder or stop portion 33 where the two portions 28 and 32 adjoin. This shaft is freely movable in said hole 14.

A retaining collar 34 is freely movable on said shaft smaller portion 28. It has a relatively large opening, commencing at one end, with interior screw-threads 36 opposite a portion of said opening that connect with said screw-threads 18 on said neck 16, thus movably retaining said plunger to said cylindrical body 10. At the end of said collar 34 nearest said cap 26 there is a relatively small hole 38 therein of such diameter that said shoulder 33 cannot pass into it, hence said plunger shaft is kept partly within said body 10.

In the greasing operation, such as greasing an automobile, ordinarily the grease passes through said inlet hole 20 into said hole 14 and through said outlet hole 12, with said plunger shaft away from said inlet hole 20, as in the position shown in said Figure 2. However, when there is a stoppage in a grease passage, the head 26 of said plunger is struck with sufficient force to drive the plunger deep into the interior of said body, even to the extent shown in said Figure 1, thereby forcing along anything blocking the grease passage. Since said plunger may be struck a hard blow with a hammer the pressure is great, and many times that of the pressure supplied by the usual greasing apparatus.

In order to automatically return the plunger to normal position, in said Figure 2, I show a coil spring 40 on said shaft 28 bearing against said head 26 and said collar 34. When said plunger, upon being struck, is forced farther than normal into said hole 14, said spring 40 is compressed, hence it automatically returns the plunger to normal position.

What I claim is:

1. A greasing ram device comprising a hollow body having a bore extending longitudinally therethrough, a filling hole extending laterally through a midportion of said body into communication with the said bore, and a discharge opening communicating with said bore, a plunger embodying a shaft and an integral, elongate, enlarged portion at its inner end extending into and slidable in said bore, said shaft carrying a head outside said body, said enlarged portion being sufficiently long to extend from said hole to said discharge opening when in discharge position, and a collar attached to said body inwardly of said plunger head having a hole therethrough in which said plunger shaft slides, the outer end of said collar being so positioned as to serve as a stop member by limiting the movement of said plunger head, said enlarged portion being of such size that it cannot pass through said collar hole and discharge openings, and of such length that the inner end, in withdrawn position of said plunger, is outwardly of said filling hole to facilitate charging with grease.

2. A greasing ram device as set forth in claim 1 embodying a coil spring between and in contact with said plunger head and said collar to automatically return said plunger from operative to inoperative position.

References Cited in the file of this patent

UNITED STATES PATENTS

| | | |
|---|---|---|
| 665,914 | Kindermann | Jan. 15, 1901 |
| 730,065 | Wilson | June 2, 1903 |
| 990,895 | Menger | May 2, 1911 |
| 1,093,965 | Bahr et al. | Apr. 21, 1914 |
| 1,174,674 | Byer | Mar. 7, 1916 |
| 1,263,590 | Morrow | Apr. 23, 1918 |
| 1,512,060 | Schmucker | Oct. 21, 1924 |
| 1,579,653 | Dieringer | Apr. 6, 1926 |
| 1,932,796 | McNaught | Oct. 31, 1933 |
| 1,995,377 | Creveling | Mar. 26, 1935 |
| 2,039,177 | MacKenzie | Apr. 28, 1936 |
| 2,128,254 | Kile | Aug. 30, 1938 |
| 2,244,952 | Kapelman | June 10, 1941 |
| 2,521,928 | Mauro et al. | Sept. 12, 1950 |
| 2,571,083 | Wilt | Oct. 9, 1951 |

FOREIGN PATENTS

| | | |
|---|---|---|
| 265,407 | Great Britain | Feb. 10, 1927 |